US012626495B2

(12) United States Patent
Nguyen et al.

(10) Patent No.: US 12,626,495 B2
(45) Date of Patent: May 12, 2026

(54) MULTIMODAL EMBEDDINGS

(71) Applicant: GOOGLE LLC, Mountain View, CA (US)

(72) Inventors: Tuan Nguyen, San Jose, CA (US); Sergei Volnov, London (GB); Yunfan Ye, Sunnyvale, CA (US); Alexey Galata, San Jose, CA (US); William A. Truong, San Jose, CA (US); Tzu-Chan Chuang, San Francisco, CA (US); Liang-yu Chen, Sunnyvale, CA (US); Qiong Huang, San Jose, CA (US); Krunal Shah, Mountain View, CA (US); Sai Aditya Chitturu, Sunnyvale, CA (US); Sana Mithani, Plantation, FL (US)

(73) Assignee: GOOGLE LLC, Mountain View, CA (US)

( * ) Notice: Subject to any disclaimer, the term of this patent is extended or adjusted under 35 U.S.C. 154(b) by 228 days.

(21) Appl. No.: 18/242,213

(22) Filed: Sep. 5, 2023

(65) Prior Publication Data

US 2025/0078484 A1    Mar. 6, 2025

(51) Int. Cl.
*G06V 10/80* (2022.01)
*G06V 40/16* (2022.01)
(Continued)

(52) U.S. Cl.
CPC ............ *G06V 10/80* (2022.01); *G06V 40/174* (2022.01); *G10L 15/183* (2013.01); *G10L 15/30* (2013.01)

(58) Field of Classification Search
None
See application file for complete search history.

(56) References Cited

U.S. PATENT DOCUMENTS

2021/0385323 A1* 12/2021 Zhao ................. H04M 1/72451
2023/0074406 A1   3/2023 Baeuml
(Continued)

OTHER PUBLICATIONS

Alayrac et al., "Flamingo: a Visual Language Model for Few-Shot Learning" arXiv:2204.14198v2 [cs.CV], 54 pages, dated Nov. 15, 2022.
(Continued)

*Primary Examiner* — Michelle M Koeth
(74) *Attorney, Agent, or Firm* — Gray Ice Higdon

(57) ABSTRACT

Implementations relate to generating and using multimodal embeddings. In various implementations, first modality data may be obtained and encoded into first modality embedding(s) using a trained first modality encoder that is stored in memory of edge-based client device(s). Second modality data may be obtained and encoded into second modality embedding(s) using a trained second modality encoder that is also stored in the memory of the edge-based client device(s). The first and second modality embeddings may be processed using an edge-based multimodal LLM that is also stored locally in memory of the edge-based client device(s) to generate a multimodal contextual embedding, which may be provided to a remote server that hosts a central LLM, e.g., in conjunction with a natural language input provided by the user. Information generated using the central LLM, responsive to the natural language input, may be received from the remote server.

6 Claims, 4 Drawing Sheets

300

OBTAIN 1ST MODALITY DATA CAPTURED IN ENVIRONMENT USING 1ST MODALITY SENSOR
302

ENCODE 1ST MODALITY DATA INTO 1ST MODALITY EMBEDDING(S) USING A TRAINED 1ST MODALITY ENCODER STORED IN MEMORY OF EDGE-BASED CLIENT DEVICE(S)
304

OBTAIN 2ND MODALITY DATA CAPTURED IN THE ENVIRONMENT USING 2ND MODALITY SENSOR, WHEREIN 2ND MODALITY IS DIFFERENT THAN 1ST MODALITY
306

ENCODE 2ND MODALITY DATA INTO 2ND MODALITY EMBEDDING(S) USING TRAINED 2ND MODALITY ENCODER THAT IS STORED IN MEMORY OF EDGE-BASED CLIENT DEVICE(S)
308

PROCESS 1ST MODALITY EMBEDDING(S) AND 2ND MODALITY EMBEDDING(S) USING EDGE-BASED MULTI-MODAL LLM STORED LOCALLY IN MEMORY OF EDGE-BASED CLIENT DEVICE(S) TO GENERATE MULTI-MODAL CONTEXTUAL EMBEDDING
310

PROVIDE, TO A REMOTE SERVER THAT HOSTS A CENTRAL LLM, DATA INDICATIVE OF THE MULTI-MODAL EMBEDDING AND A NL INPUT PROVIDED BY THE USER
312

RECEIVE, FROM REMOTE SERVER, INFORMATION GENERATED USING THE CENTRAL LLM THAT IS RESPONSIVE TO NL INPUT PROVIDED BY USER
314

(51) Int. Cl.
     G10L 15/183     (2013.01)
     G10L 15/30     (2013.01)

(56)           References Cited

U.S. PATENT DOCUMENTS

2024/0354641 A1* 10/2024 Miller .................... G06N 3/045
2024/0355010 A1* 10/2024 Ahafonov ............. G06T 11/001
2024/0355131 A1* 10/2024 Kuppersmith ............ G06T 1/60

OTHER PUBLICATIONS

Chen et al., "PaL1: A Jointly-Scaled Multilingual Language-Image Model" arXiv:2209.06794v2 [cs.CV], 30 pages, dated Sep. 16, 2022.
European Patent Office; International Search Report and Written Opinion issued in Application No. PCT/US2024/042112; 13 pages; dated Nov. 18, 2024.

* cited by examiner

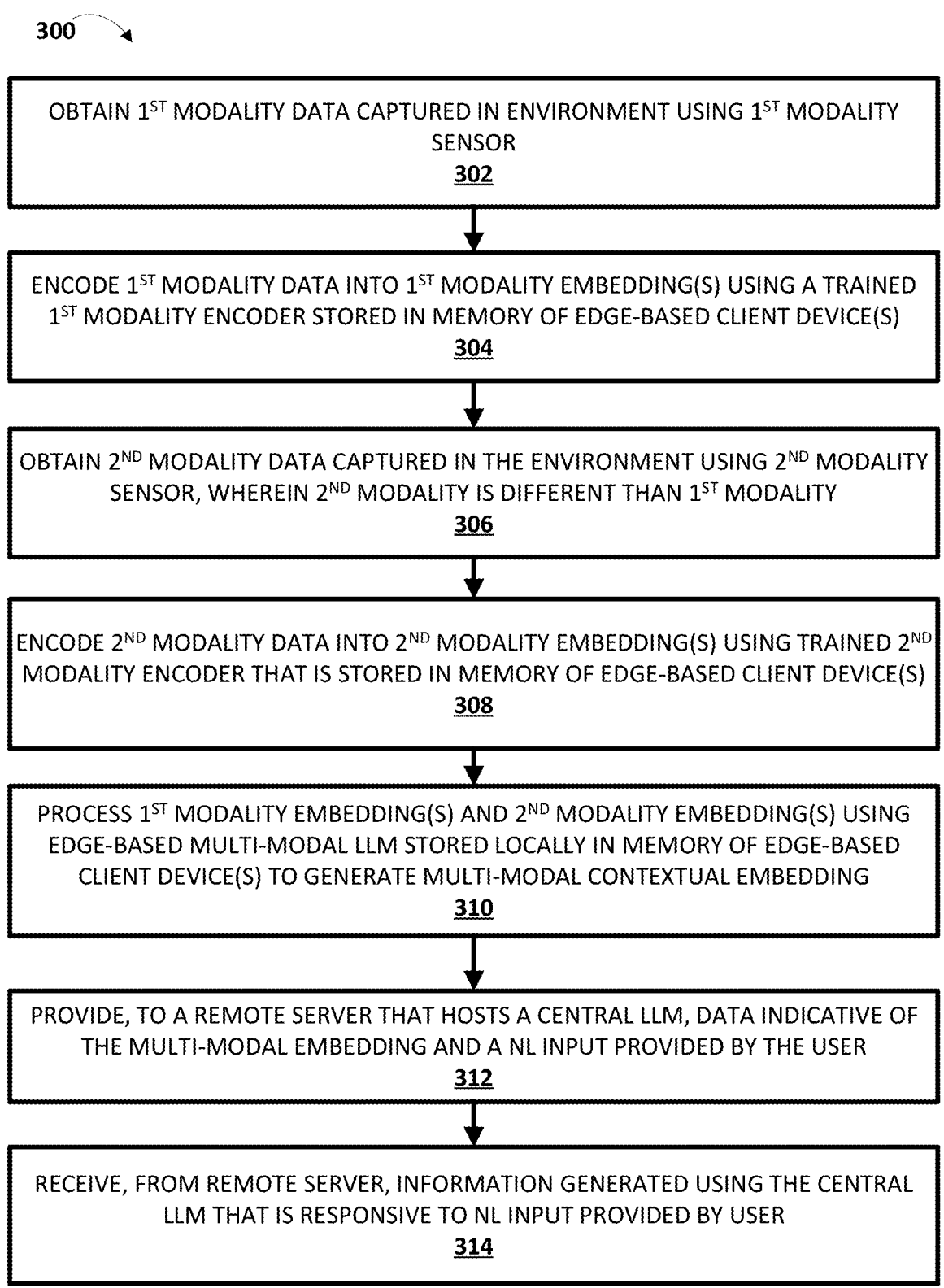

300

OBTAIN 1ST MODALITY DATA CAPTURED IN ENVIRONMENT USING 1ST MODALITY SENSOR
302

ENCODE 1ST MODALITY DATA INTO 1ST MODALITY EMBEDDING(S) USING A TRAINED 1ST MODALITY ENCODER STORED IN MEMORY OF EDGE-BASED CLIENT DEVICE(S)
304

OBTAIN 2ND MODALITY DATA CAPTURED IN THE ENVIRONMENT USING 2ND MODALITY SENSOR, WHEREIN 2ND MODALITY IS DIFFERENT THAN 1ST MODALITY
306

ENCODE 2ND MODALITY DATA INTO 2ND MODALITY EMBEDDING(S) USING TRAINED 2ND MODALITY ENCODER THAT IS STORED IN MEMORY OF EDGE-BASED CLIENT DEVICE(S)
308

PROCESS 1ST MODALITY EMBEDDING(S) AND 2ND MODALITY EMBEDDING(S) USING EDGE-BASED MULTI-MODAL LLM STORED LOCALLY IN MEMORY OF EDGE-BASED CLIENT DEVICE(S) TO GENERATE MULTI-MODAL CONTEXTUAL EMBEDDING
310

PROVIDE, TO A REMOTE SERVER THAT HOSTS A CENTRAL LLM, DATA INDICATIVE OF THE MULTI-MODAL EMBEDDING AND A NL INPUT PROVIDED BY THE USER
312

RECEIVE, FROM REMOTE SERVER, INFORMATION GENERATED USING THE CENTRAL LLM THAT IS RESPONSIVE TO NL INPUT PROVIDED BY USER
314

Fig. 3

MULTIMODAL EMBEDDINGS

BACKGROUND

Large language models (LLMs) are particular types of machine learning models—sometimes referred to as "generative models"—that can perform various natural language processing (NLP) tasks, such as language generation, machine translation, and question-answering. These LLMs are typically trained on enormous amounts of diverse data including data from, but not limited to, webpages, electronic books, software code, electronic news articles, and machine translation data. Accordingly, these LLMs leverage the underlying data on which they were trained in performing these various NLP tasks. For instance, in performing a language generation task, these LLMs can process a natural language (NL) based input that is received from a client device, and generate a NL based output that is responsive to the NL based input and that is to be rendered at the client device.

Visual language models (VLMs) are a type of multimodal machine learning model that can be used to perform tasks based on multiple modalities of data, particularly visual data (e.g., digital images) in combination with NL. VLMs may be trained to facilitate performance of a variety of different tasks, such as visual question answering, text-guided image manipulation, and image captioning, to name a few. With visual question answering, for instance, input image(s) and NL question(s) about the image(s) may be assembled into a prompt that is then processed using a VLM to generate an output sequence indicative of answer(s) to the question(s).

SUMMARY

While visual cues have been used to invoke or "awaken" automated assistants, sometimes in combination with hot words or phrases, visual data has not typically been incorporated into ongoing conversations with automated assistants after invocation. Accordingly, implementations are described herein for using LLMs, VLMs, and/or multimodal LLMs to facilitate multimodal engagement and continued conversation with an automated assistant (also referred to as a "virtual assistant" or "chatbot"). More particularly, but not exclusively, techniques are described herein for processing multiple modalities of features, e.g., generated by multiple on-device encoders, using a local (e.g., scaled down) multimodal LLM that may be deployed on the same device and/or at the "edge," e.g., on another device that is nearby. The multimodal LLM may then be used to generate, at the edge, a semantically rich multimodal embedding that represents a user's context. This multimodal embedding can be provided to a server for processing, e.g., along with data indicative of the user's natural language input, using a server-side LLM.

In some implementations, a method may be implemented using one or more processors and may include: obtaining first modality data captured in an environment using a first modality sensor; encoding the first modality data into one or more first modality embeddings using a trained first modality encoder that is stored in memory of one or more of the edge-based client devices; obtaining second modality data captured in the environment using a second modality sensor, wherein the second modality is different than the first modality; encoding the second modality data into one or more second modality embeddings using a trained second modality encoder that is stored in memory of one or more of the edge-based client devices; processing one or more of the first modality embeddings and one or more of the second modality embeddings using an edge-based multimodal large language model (LLM) that is stored locally in memory of one or more of the edge-based client devices to generate a multimodal contextual embedding; providing, to a remote server that hosts a central LLM, data indicative of the multimodal embedding and a natural language input provided by the user; and receiving, from the remote server, information generated using the central LLM that is responsive to the natural language input provided by the user.

In various implementations, the first modality data may include one or more digital images captured by one or more digital cameras. In various implementations, the one or more digital images may include one or more screenshots captured by one or more of the edge-based client devices. In various implementations, the one or more digital images may include a first digital image acquired by a front-facing camera of a given edge-based client device of the edge-based client devices. In various implementations, the one or more digital images may include a second digital image acquired by a rear-facing camera of the given edge-based client device. In various implementations, the one or more digital images may include one or more screenshots captured by one or more of the edge-based client devices. In various implementations, the first digital image captures a facial expression of the user, and one or more of the first modality embeddings numerically represents the captured facial expression.

In various implementations, the second modality data may include audio data and the second modality sensor comprises a microphone. In various implementations, the first modality data may include a digital video captured by a digital video camera.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 3 depicts a flowchart illustrating an example method of practicing selected aspects of the present disclosure, in accordance with various implementations.

DETAILED DESCRIPTION OF THE DRAWINGS

Figure 1:
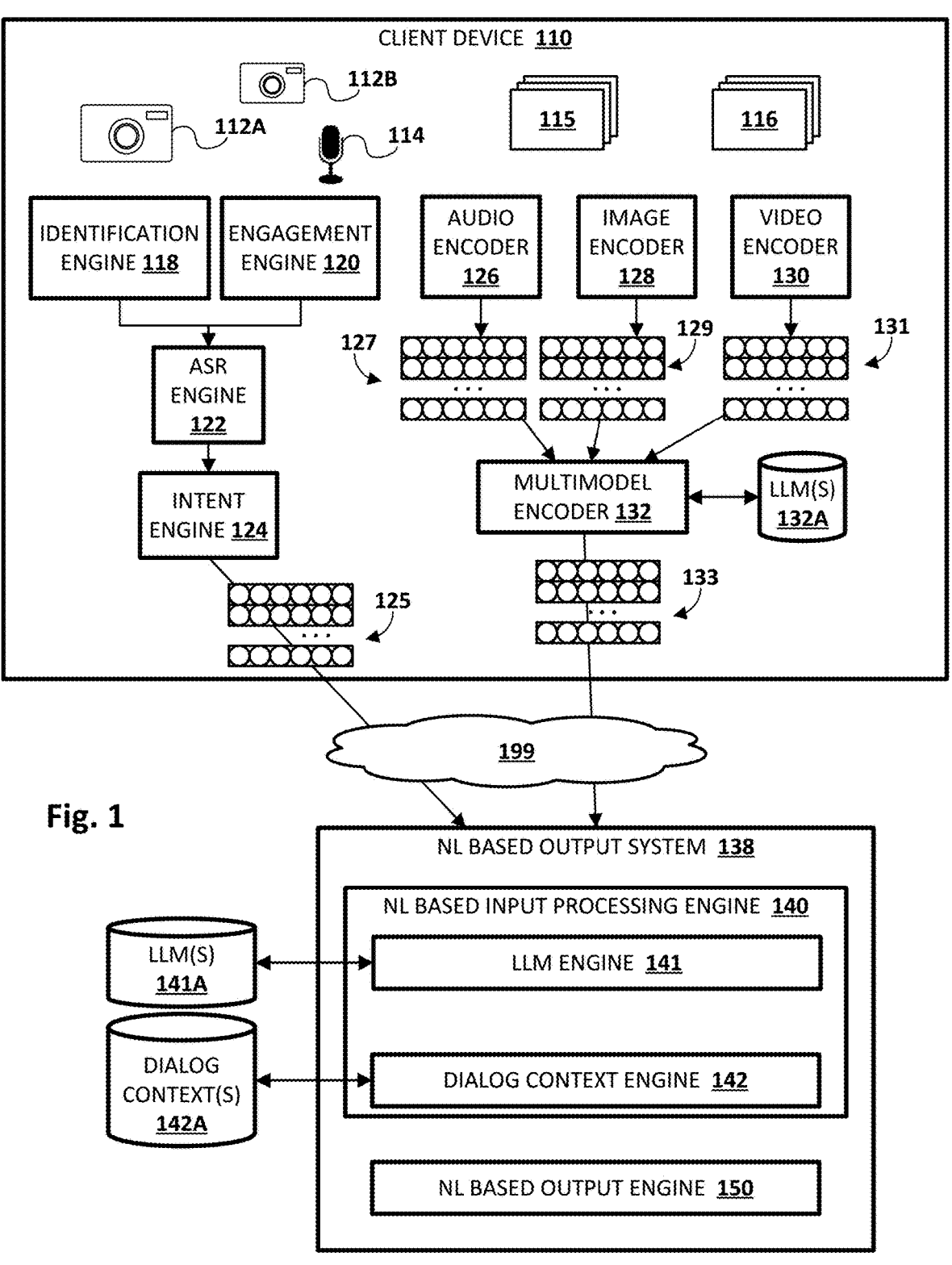
FIG. 1 depicts a block diagram of an example environment that demonstrates various aspects of the present disclosure, and in which some implementations disclosed herein can be implemented.

While visual cues have been used to invoke or "awaken" automated assistants, sometimes in combination with hot words or phrases, visual data has not typically been incorporated into ongoing conversations with automated assistants after invocation. Accordingly, implementations are described herein for using LLMs, VLMs, and/or multimodal LLMs to facilitate multimodal engagement and continued conversation with an automated assistant (also referred to as a "virtual assistant" or "chatbot"). More particularly, but not exclusively, techniques are described herein for processing multiple modalities of features, e.g., generated by multiple on-device encoders, using a local (e.g., scaled down) multimodal LLM that may be deployed on the same device and/or at the "edge," e.g., on another device that is nearby. The multimodal LLM may then be used to generate, at the edge, a semantically rich multimodal embedding that represents a user's context. This multimodal embedding can be provided to a server for processing, e.g., along with data indicative of the user's natural language input, using a server-side LLM.

In various implementations, multiple modalities of data may be captured by multiple different sensors. As an example, when a user operates a smartphone or tablet, a front facing (or "selfie") camera of the device may capture the user's face. Additionally or alternatively, in some implementations, a rear-facing camera of the device, or another camera in the vicinity, may capture part of an environment in which the user is located. In some implementations, screenshots captured by the device, e.g., on demand, periodically (with user permission), in response to other stimuli (e.g., the user submitting a natural language query), etc., may be another form of data that may be acquired.

Additional modalities of data may be captured by other sensors. For instance, audio data may be captured and/or recorded using a microphone of the device (or another microphone deployed in the vicinity), a video camera of the device or otherwise deployed in the vicinity (and may be one or both of the front facing and rear facing cameras mentioned previously) may be used to capture video data, and/or any other sensor may be configured to generate sensor data indicative of other attributes of the environment and/or the user's context as a whole.

In various implementations, these various modalities of data may be used, by LLM(s) deployed on remote server(s), in various combinations with user-provided natural language input to generate responsive content. However, providing raw sensor data to the server-side LLM(s) may have a variety of drawbacks. For one, captured sensor data may be large, and therefore, transmitting it in raw form to a server may use too much network bandwidth. Moreover, users may not be comfortable with sharing raw sensor data, particularly images, videos, and/or audio data captured in their homes, that may potentially be private.

Accordingly, in various implementations, a local, scaled down multimodal LLM may be deployed at the edge, e.g., onboard a device operated by the user or on another edge device that is in communication with the device operated by the user. In various implementations, the different modalities of sensor data may be encoded, e.g., by one or more pretrained encoders, into multiple embeddings representing the different modalities of captured sensor data. These embeddings may then be processed using the local, scaled down multimodal LLM to generate a multimodal contextual embedding.

This multimodal contextual embedding, if intercepted by unauthorized parties, may not be readily interpretable and/or may not be readily decoded into the multiple modalities of raw sensor data that were used to generate it. Consequently, it is less risky to transmit the multimodal contextual embedding to the cloud for processing using a "full scale" LLM. Accordingly, the multimodal contextual embedding may be transmitted to the cloud, e.g., in combination with one or more natural language inputs provided by the user contemporaneously with the sensor data's capture. The cloud-based, full scale LLM may then be applied to the multimodal contextual embedding and natural language input. For instance, an LLM prompt may be assembled, e.g., at the edge and/or at the cloud. The LLM prompt may then be processed using the full scale LLM to generate LLM output indicative of content that is responsive to the user's natural language input.

The following is a non-limiting example of how techniques described here can be implemented to provide a user with a more tailored experience when engaging in human-to-computer dialog with an automated assistant (also referred to as a "virtual assistant"). Suppose the user operates a tablet device and speaks the utterance, "Hey assistant, play music by Artist X." With existing automated assistants, a song by Artist X may be selected randomly and/or based on contextual cues such as the user's preferences, preferences of people at large, prior listening history of the user, the user's location, the time of day, and so forth. With techniques described herein it is possible to incorporate additional modalities of context, generated from multiple different modalities of sensor data, into the decision of which song by Artist X to play.

For example, a selfie camera of the tablet device may capture image(s) of the user's face contemporaneously with issuance of the user's command. These digital images may portray the user's facial expression (and hence, mood), e.g., before, during, or immediately after issuing the command. Depending on how the user is holding the tablet (e.g., the tablet's pose), a rear-facing camera of the tablet device may capture image(s) of the room, and/or noise and/or blackness (e.g., if the tablet is positioned flat on a surface, in the user's lap, etc.). If the rear-facing image(s) depict a room with significant activity (e.g., a party or get together), that may suggest a lively or jubilant mood. In some cases, screenshot(s) may also be captured contemporaneously with issuance of the user's command. The application operated by the user contemporaneously with their utterance may also be indicative of the user's mood or of the mood of the room at large.

Additionally or alternatively, ambient audio data may be recorded, e.g., using the same microphone that captured the user's utterance or a different microphone. This recorded ambient audio may be indicative of a general "mood" of the room. For instance, if the ambient noise is relatively loud, includes jovial conversations, laughter, etc., that suggests a room with a "lively" or "jubilant" mood. By contrast, if the ambient noise is relatively quiet or silent (other than the user's utterance), that suggests a room with a "calm" or "serene" mood.

In various implementations, the various digital image(s) captured by the selfie and rear-facing cameras, and/or the screenshot(s), may be encoded, e.g., using an edge-based (e.g., onboard) encoder, into visual embedding(s). In some cases, each visual modality may be encoded into a separate embedding. In some such implementations, those separate embeddings may be combined, e.g., using concatenation, averaging, etc., although this is not required. Likewise, the audio recording may be encoded, e.g., using an edge-based (e.g., onboard) audio encoder, into audio embedding(s).

In various implementations, the visual and audio embeddings may be assembled into a LLM prompt. The LLM prompt may then be processed, e.g., using an onboard LLM that may be scaled down relative to a remote/cloud-based full scale LLM, to generate a multimodal contextual embedding. For instance, the onboard LLM may include a subset of layers of the full scale LLM, such as the first n layers. This may enable the onboard LLM to generate the multimodal contextual embedding in a reasonable amount of time. The multimodal contextual embedding may encode sufficient semantic information such that it can then be transmitted to the cloud for further processing using the full-scale LLM. Because the various modalities of sensor data have been twice encoded—once by their respective onboard encoders and again using the onboard LLM—they cannot be readily extracted or reconstructed from the transmitted multimodal contextual embedding that is transmitted to the cloud.

The techniques described herein provide a number of technical advantages. Instead of local sensor data being uploaded directed to the cloud for processing, the local sensor data is encoded into the aforementioned multimodal contextual embeddings that are then provided to the cloud. This may preserve the privacy of users who do not wish for raw sensor data, such as recorded audio, video, and/or digital images, to be exposed directly to the cloud. This may also conserve computing resources such as network bandwidth and/or CPU cycles. Transmitting reduced-dimensionality embeddings may require less bandwidth than raw sensor data. Similarly, applying a cloud-based LLM—which may contain hundreds of millions or billions of parameters—to raw sensor data may require far more computations than applying the cloud-based LLM to reduced dimensionality embeddings. While cloud-based computing resources may be less constrained than edge-based computing resources, they also may be applied at the request of enormous numbers of end users, which can strain even the most powerful computing resources. Thus, processing multimodal contextual embeddings that are pre-generated at the edge can conserve computing resources at the cloud.

Turning now to FIG. 1, a block diagram of an example environment that demonstrates various aspects of the present disclosure, and in which implementations disclosed herein can be implemented is depicted. The example environment includes a client device 110 and a natural language (NL) based output system 138, which is depicted separately in FIG. 1. In some implementations, all or aspects of the NL based output system 138 can be implemented locally at the client device 110. In additional or alternative implementations, all or aspects of the NL based output system 138 can be implemented remotely from the client device 110 as depicted in FIG. 1 (e.g., at remote server(s)). In those implementations, the client device 110 and the NL based output system 138 can be communicatively coupled with each other via one or more networks 199, such as one or more wired or wireless local area networks ("LANs," including Wi-Fi, mesh networks, Bluetooth, near-field communication, etc.) or wide area networks ("WANs", including the Internet).

The client device 110 can be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute one or more software applications (not depicted) through which NL based input can be submitted and/or NL based output and/or other output that is responsive to the NL based input can be rendered (e.g., audibly and/or visually). These software applications may be separate from an operating system of the client device 110 (e.g., one installed "on top" of the operating system)—or can alternatively be implemented directly by the operating system of the client device 110. For example, a web browser or automated assistant may be installed on top of the operating system of the client device 110. As another example, a web browser software application or automated assistant software application may be integrated as part of the operating system of the client device 110.

In various implementations, the client device 110 can include various sensors or other input devices that are operable to obtain contextual information in various different modalities. For instance, in FIG. 1, client device 110 includes a first camera 112A, a second camera 112B, a microphone 114, and various other sensors 115, such as global positioning system (GPS) sensor(s), accelerometer(s), gyroscope(s), proximity sensor(s), ambient light sensor(s), etc. Client device 110 may also be configured to capture screenshot(s) 116, e.g., on demand, periodically, in response to various events, etc. In implementations where client device 110 is a smartphone or tablet computer, first camera 112A may be a rear-facing camera and second camera 112B may be a front-facing or "selfie" camera. In other implementations, first and second cameras 112A-B may be separate components that are incorporated with separate client devices, or even standalone cameras deployed at different locations within an environment.

Some instances of a NL based input described herein can be a query for a NL response that is formulated based on user input provided by a user of the client device 110 in one or more modalities. For example, the query can be a typed query that is typed via a physical or virtual keyboard, a suggested query that is selected via a touch screen or a mouse of the client device 110, a spoken voice query that is detected via microphone(s) 114 of the client device 110 (and optionally directed to an automated assistant executing at least in part at the client device 110), an image or video query that is based on vision data captured by camera(s) 112A-112B of the client device 110 (or based on NL input generated based on processing the image using, for example, object detection model(s), captioning model(s), etc.), or any combination thereof. Other instances of a NL based input described herein can be a prompt for NL content that is formulated based on user input provided by a user of the client device 110. For example, the prompt can be a typed prompt that is typed via a physical or virtual keyboard, a suggested prompt that is selected via a touch screen or a mouse of the client device 110, a spoken prompt that is detected via microphone(s) 114 of the client device 110, or an image prompt that is based on an image captured by a camera (e.g., 112A, 112B) of the client device 110.

In various implementations, the client device 110 may be configured to render content (e.g., NL based output, an indication of source(s) associated with the NL based output, and/or other content) for audible and/or visual presentation to a user of the client device 110 using one or more user interface output devices (not depicted). For example, the client device 110 can be equipped with one or more speakers (not depicted) that enable the content to be provided for audible presentation to the user via the client device 110. Additionally, or alternatively, the client device 110 can be equipped with a display or projector (not depicted) that enables the content to be provided for visual presentation to the user via the client device 110. In some implementations, client device 110 or NL based output system 138 may be configured to, in addition to providing audio or visual output, control one or more "smart" (e.g., network connected) devices and/or appliances, such as smart lights, smart televisions, smart heating ventilation and air conditioning (HVAC) equipment, smart kitchen appliances, and so forth.

In various implementations, the client device 110 may be configured to determine a context (e.g., current or recent context) of the client device 110 and/or of a user of the client device 110 (e.g., an active user of the client device 110 when the client device 110 is associated with multiple users) based on multiple modalities of data. In some of those implementations, client device 110 can determine a context based on data such as, for example, user interaction data that characterizes current or recent interaction(s) of the client device 110 and/or a user of the client device 110, location data that characterizes a current or recent location(s) of the client device 110 and/or a user of the client device 110, user attribute data that characterizes one or more attributes of a user of the client device 110, user preference data that characterizes one or more preferences of a user of the client device 110, user profile data that characterizes a profile of a user of the client device 110, and/or any other data accessible to client device 110. In some implementations, data from various sensors 115 may also be used to determine the user's context.

For example, client device 110 can determine a current context based on a current state of a dialog session (e.g., considering one or more recent inputs provided by a user during the dialog session), profile data, and/or a current location of the client device 110. For instance, client device 110 can determine a current context of "visitor looking for upcoming events in Louisville, Kentucky" based on a recently issued query, profile data, and an anticipated future location of the client device 110 (e.g., based on recently booked hotel accommodations and/or based on a trajectory of client device 110). As another example, client device 110 can determine a current context based on which software application is active in the foreground of the client device 110, a current or recent state of the active software application, and/or content currently or recently rendered by the active software application. A context determined by client device 110 can be utilized, for example, in supplementing or rewriting NL based input that is formulated based on user input, in generating an implied NL based input (e.g., an implied query or prompt formulated independent of any explicit NL based input provided by a user of the client device 110), and/or in determining to submit an implied NL based input and/or to render result(s) (e.g., an NL based output) for an implied NL based input.

Client device 110 may also include various engines that facilitate selected aspects of the present disclosure. These engines may include engines that are configured to process NL queries provided by user(s) (not depicted). On the left side of client device 110 in FIG. 1, for instance, an identification engine 118, an engagement engine 120, an automatic speech recognition (ASR) engine 122, and an intent engine 124 are provided to generate a query embedding 125 that semantically represents an intent of a user's NL query, based on various contextual signals. On the right side of client device 110, an audio encoder 126, an image encoder 128, a video encoder 130, and a multimodal encoder 132 are provided to facilitate assembly of multimodal contextual embedding(s) 133 that richly and safely (e.g., safe from unauthorized interpretation) represent a context of the user and/or of client device 110.

Identification engine 118 may be configured to process vision data captured by camera(s) 112A-B and/or audio data captured by microphone 114, e.g., by fusing or otherwise combining embeddings encoded from each sensor's data and evaluating the fused multimodal embedding (not depicted). Based on this evaluation, identification engine 118 may be configured to distinguish between different types of users. In some implementations, identification engine 118 may be configured to generate a probability distribution over different types of users based on this evaluation. These various types of users over which the probability distribution is generated may include, for instance, "not a registered user," "unlikely a registered user," "a registered user," a "trusted user," and so forth.

Engagement engine 120 may be configured to determine a level of engagement of one or more users that are present with client device 110 based on various modalities of sensor data, such as the same or similar modalities of sensor data used by identification engine 118 to classify user types. For example, engagement engine 120 may evaluate features captured by sensors 112A-B, 114, and/or 115, e.g., by encoding the sensor signals into feature-rich embeddings, to determine whether one or more users that are co-present with client device appear to be engaging with client device 110 and/or the automated assistant or not, and/or a measure of engagement along a continuum.

In some implementations, identification engine 118 and/or engagement engine 120 may be configured to perform sound separation on sensor data captured by camera(s) 112A-B and/or microphone 114. This sound separation processing may seek to distinguish speech that appears to be directed to client device 110 and/or the automated assistant from background and/or ambient noise or conversation.

As its name suggests, ASR engine 122 may be configured to transcribe spoken utterances received at microphone 114 into speech recognition textual output. In some implementations, ASR engine 122 may transcribe a spoken utterance in response to a determination made based on output of identification engine 118 and/or engagement engine 120 that a user's spoken utterance was directed at client device 110 and/or an automated assistant. ASR engine 122 may provide the transcribed textual output to intent engine 124. Intent engine 124 may be configured to semantically process the transcribed text, and/or various sensor data (e.g., from 112A-B, 114), and/or output from engines 118 and/or 120, to resolve the intent behind NL input(s) and/or generate the aforementioned NL query embedding 125.

Meanwhile, encoders 126, 128, 130 may be configured to process multiple modalities of data and generate respective embeddings 127, 129, 131 that can then be processed by multimodal encoder 132. For instance, audio encoder 126 may be configured to process audio data captured by microphone 114 to generate one or more audio embeddings 127. Image encoder 128 may be configured to process imagery captured by cameras 112A-B and/or screenshot(s) 116 to generate one or more image embeddings 129. In some implementations, video encoder 130 may be configured to process video data captured by one or more of cameras 112A-B to generate one or more video embeddings 131. In some implementations, video encoding may be performed instead by image encoder 128. In some implementations, sensor signal(s) generated by sensor(s) 115 may also be encoded, e.g., into additional embeddings beyond 127, 129, 131 and/or as part of embeddings 127, 129, 131.

Encoders 126, 128, 130 may take various forms, such as software applications that are configured to reduce the dimensions of sensor data captured by the various sensors (112A-B, 114, 115) and/or screenshot(s) 116, while maintaining their semantic meanings. In some implementations, encoders 126, 128, and/or 130 may use machine learning models (not depicted in FIG. 1) to generate the respective embeddings 127, 129, and/or 131. These machine learning models may take various forms, such as various types of neural networks, convolutional neural networks (CNNs), transformer networks, LLMs, and so forth. These machine learning models may be trained using techniques such as back propagation and/or gradient descent, contrastive learning, cross entropy, and so forth.

Multimodal encoder 132 may utilize one or more client-side or "local" LLMs 132A to process embeddings 127, 129, 131 to generate multimodal contextual embedding 133, which may be used by NL-based output system 138 as a context embedding alongside query embedding 125. In some implementations, LLM(s) 132A may include, for instance, a scaled down version of a remote LLM, e.g., LLM(s) stored in LLM database 141A. For example, LLM(s) 132A may include significantly fewer parameters and/or weights than LLM(s) stored in LLM database 141A, such as orders of magnitude fewer parameters and/or weights. Scaling down LLM(s) 132A in this manner enables client device 110, which may be resource-constrained relative to NL-based output system, to nonetheless calculate multimodal contextual embedding 133 quickly and without consuming inordinate computing resources.

Although aspects of FIG. 1 are illustrated or described with respect to a single client device 110 having a single user, it should be understood that is for the sake of example and is not meant to be limiting. For example, one or more additional client devices of a user and/or of additional user(s) can also implement the techniques described herein. For instance, the client device 110, the one or more additional client devices, and/or any other computing devices of a user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., a group of users, a household, a workplace, a hotel, etc.).

The NL based output system 138 is illustrated in FIG. 1 as including a NL based input processing engine 140, a visual input processing engine 144, and a NL based output engine 150. Some of these engines can be combined and/or omitted in various implementations. Further, these engines can include various sub-engines. For instance, the NL based input processing engine 140 is illustrated in FIG. 1 as including a LLM engine 141 and a dialog context engine 142. Similarly, some of these sub-engines can be combined and/or omitted in various implementations. Accordingly, it should be understood that the various engines and sub-engines of the NL based output system 138 illustrated in FIG. 1 are depicted for the sake of describing certain functionalities and are not meant to be limiting.

Further, the NL based output system 138 is illustrated in FIG. 1 as interfacing with various databases, such as LLM(s) database 141A and a dialog context(s) database 142A. Although particular engines and/or sub-engines are depicted as having access to particular databases, it should be understood that is for the sake of example and is not meant to be limiting. For instance, in some implementations, each of the various engines and/or sub-engines of the NL based output system 138 may have access to each of the various databases. Further, some of these databases can be combined and/or omitted in various implementations. Accordingly, it should be understood that the various databases interfacing with the NL based output system 138 illustrated in FIG. 1 are depicted for the sake of describing certain data that is accessible to the NL based output system 138 and is not meant to be limiting.

In various implementations, NL based output system 138 can cause the LLM engine 141 to process, using an LLM stored in the LLM(s) database 141A, NL based input to generate a stream of LLM output that may be provided by NL based output engine 150. In the present context, NL based output system 138 may cause LLM engine 141 to process query embedding 125 in conjunction with multimodal contextual embedding 133, e.g., as part of a prompt for an LLM stored in database 141A. The LLM can include, for example, any LLM that is stored in the LLM(s) database 141A, such as PaLM, BARD, BERT, LaMDA, Meena, GPT, and/or any other LLM, such as any other LLM that is encoder-only based, decoder-only based, sequence-to-sequence based and that optionally includes an attention mechanism or other memory.

The stream of LLM output provided to NL based output engine 150 can include, for example, a probability distribution over a sequence of tokens, such as words, phrases, or other semantic units, which are predicted to be responsive to the NL based input. Notably, LLM(s) in database 141A can include billions of weights and/or parameters that are learned through training the LLM on enormous amounts of diverse data. This enables the LLM to generate the LLM output as the probability distribution over the sequence of tokens. In various implementations, NL based output system 138 may cause dialog context engine 142 to manage dialog contexts based on data stored in dialog context database 142A, including identifying new dialog contexts, shifting between existing dialog contexts, etc.

Figure 2A:
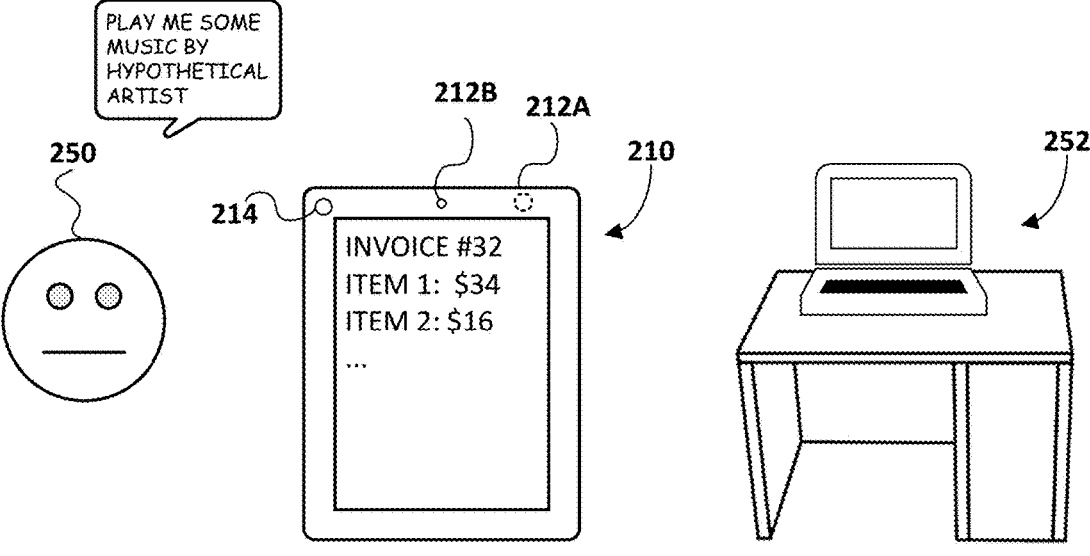
FIG. 2A schematically depicts an example of how multiple modalities of data may be evaluated to formulate an assistant response, in accordance with various implementations.
Figure 2B:
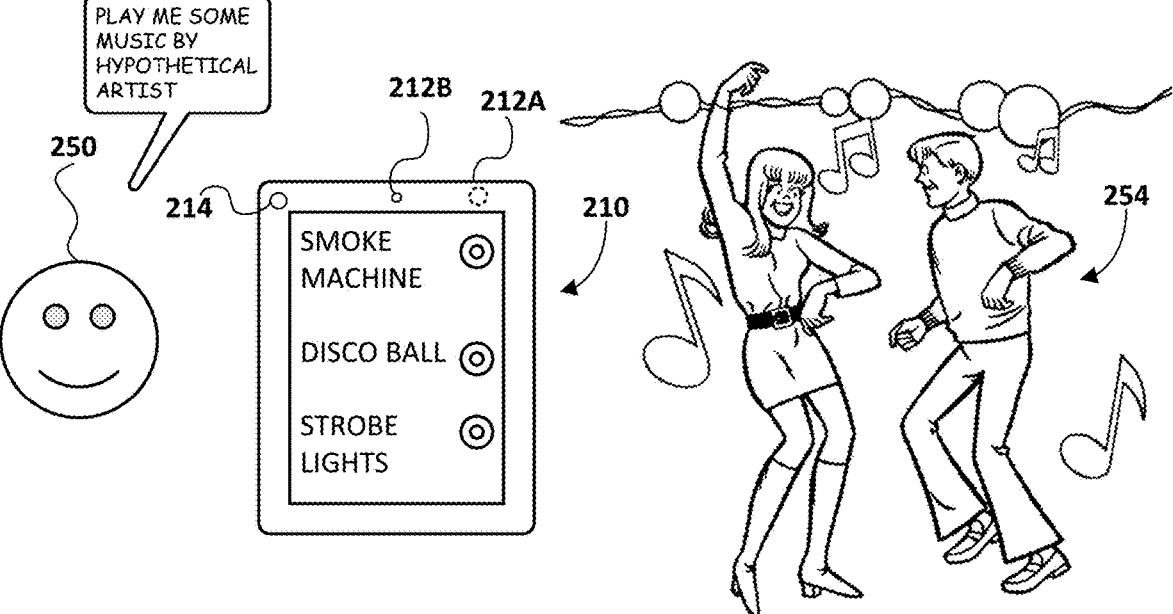
FIG. 2B schematically depicts another example of how multiple modalities of data may be evaluated to formulate an assistant response, in accordance with various implementations.

FIGS. 2A and 2B depict examples of techniques described herein being used to select music based on multiple modalities of input data. In FIGS. 2A and 2B, it should be assumed that a user is operating a client device 210 that shares various characteristics with client device 110 in FIG. 1. Client device 210 may be, for instance, a smartphone or tablet computer that the user interacts with to engage with NL based output system 138. In both examples, the user has spoken the utterance, "Play me some music by Hypothetical Artist," which is captured by microphone 214 of client device 210. Contemporaneously with this utterance, user's face 250 is captured by a front-facing (or "selfie") camera 212B, which may correspond to front-facing camera 112B of client device 110 in FIG. 1. Microphone 214 may share characteristics with microphone 114 in FIG. 1. And rear-facing camera 212A may share characteristics with rear-facing camera 112A of FIG. 1.

In FIG. 2A, front facing camera 212B captures the user's face 250 having a neutral or bored expression. This may be because the user is at school or work. In such a scenario, front-facing camera 212B may capture the user's environment, or the floor or another feature-less surface if the user is holding client device 210 facing downward, in their lap, etc. In FIG. 2A, front-facing camera 212B captures the user's workspace 252 (which includes a desk and a computer). Client device 210 also may capture screenshot(s) (e.g., 116 in FIG. 1) of what is being displayed. In FIG. 2A this includes an invoice which appears to be related to the user's occupation. In addition, microphone 214 may capture, in addition to the user's utterance, ambient noise of the user's environment.

In various implementations, the various modalities of data captured in FIG. 2A may be processed as described previously with respect to FIG. 1 to determine an appropriate response to the user's utterance that accounts for both the user's explicit intent (play music by hypothetical artist) the multiple modalities of data. In addition, raw sensor data need not be uploaded from client device 210 to NL based output system 138, potentially exposing private user data to others. Instead, the raw sensor data is encoded into a multimodal contextual embedding (133 in FIG. 1), which captures the semantics of the user's context, and which is uploaded to NL based output system 138.

In FIG. 2A, the collection of the user's neutral expression 250, their current environment (including both visual sensor data and audio sensor data), and what they're doing on client device 210, suggests that the user's context is relatively neutral, subdued, etc. The image of the user's neutral expression 250 captured by front-facing camera 212B and the image of the user's environment captured by rear-facing camera 212A may be processed by image encoder 128 (or video encoder 130 if there is a sequence of images) to generate one or more image embedding(s) 129 (or video embedding(s) 131 as the case may be). Likewise, the screenshot of the invoice may be processed by image encoder 128 to generate one or more of the image embeddings 129 (or of the video embedding(s) 131 as the case may be). A recording of the ambient noise in the user's environment that is captured by microphone 214 may be processed by audio encoder 126 to generate one or more audio embeddings 127.

Audio embedding(s) 127, image embedding(s) 129, and video embedding(s) 131 if available, may be processed by multimodal encoder 132 (see FIG. 1) to generate multimodal contextual embedding(s) 133. Multimodal contextual embedding(s) 133 may then be provided by client device 210 over one or more networks (e.g., 199) to NL based output system 138. NL based output system 138 may cause LLM engine 141 to process multimodal contextual embedding(s) 133 using one or more LLM(s) in database 141A to generate output tokens that can then be provided to NL based output engine 150. Given the subdued or neutral context evident from the various modalities captured in FIG. 2A, the NL response may be something like "OK, playing Hypothetical Artist," and a relatively quiet or subdued song by Hypothetical Artist may begin playback.

FIG. 2B represents a starkly different context than FIG. 2A. In FIG. 2B, an image captured by front-facing camera 212B of the user's facial expression 250 shows that the user is smiling. Client device 210 currently displays an interface that allows the user to interact with and/or control various devices that are typically related to a festive atmosphere (e.g., a party or celebration), such as a smoke machine, a disco ball, and strobe lights. An image captured by rear-facing camera 212A depicts the user's environment 254, which includes people dancing to music. Taken together, these various modalities strongly suggest the user is likely happy, jovial, and/or exhilarated.

Suppose the user once again utters the request, "Play me some music by hypothetical artist." This utterance may be captured by microphone 214, contemporaneously with ambient noise in the user's environment. The recording and/or data indicative thereof may be processed by identification engine 118 and/or engagement engine 120, along with other modalities of data captured by sensors 212A, 212B, and 214 (and screenshot(s)), to generate a query embedding 125. Given the jovial context evident from the various modalities captured in FIG. 2B, the NL response may be something like "OK, playing Hypothetical Artist," and a relatively intense, fast, jovial, exciting, etc., song by Hypothetical Artist may begin playback.

The systems of FIGS. 1 and 2 may be trained using similar techniques. For instance, multiple modalities of data may be captured when a user provides a spoken utterance. In some implementations, user feedback (e.g., explicit or an observed reaction) received based on the ultimate NL response/output may be used, e.g., to calculate a reward or other signal, that can be used to train various models, such as LLM(s) 132A, audio or visual encoder models employed by encoders 126, 128, and so forth, using techniques such as back propagation, gradient descent, cross entropy, etc.

In other implementations, if the user provides a specific enough request, then the user's subsequent reaction to the response may not be required for training, although it can still be used. For instance, suppose instead of requesting music by a specific artist, a user requests a specific song by the artist. The requested song may be used in conjunction with the various modality contextual embeddings (e.g., 125, 133) to train an LLM of database 141A, e.g., so that the LLM is better able to predict contexts when that particular song, or songs similar to it, should be played and should not be played. For example, the specific request and the various modality embeddings may be processed using the LLM during fine tuning.

FIG. 3 depicts a flowchart illustrating an example method 300 of operating one or more edge-based processors to practice selected aspects of the present disclosure, in accordance with various implementations. For convenience, the operations of method 300 are described with reference to a system that performs the operations. This system may include one or more processors, memory, and/or other component(s) of computing device(s), particularly client devices 110 and/or 210, including the various engines and/or encoders (118, 120, 122, 124, 126, 128, 130, 132) depicted in FIG. 1. Moreover, while operations of the method 300 are shown in a particular order, this is not meant to be limiting. One or more operations may be reordered, omitted, and/or added.

At block 302, the system may obtain first modality data captured in an environment using a first modality sensor. For example, microphone 114/214 may capture a user's spoken utterance and/or contemporaneous ambient noise. At block 304, the system may encode the first modality data into one or more first modality embeddings using a trained first modality encoder that is stored in memory of one or more of the edge-based client devices. For example, the user's utterance may be transcribed, e.g., by ASR engine 122 and/or encoded into an audio embedding 127 by audio encoder 126.

At block 306, the system, e.g., via one or more of cameras 112A, 112B, 212A, 212B, or via screenshots generated by client device 110/210, may obtain second modality data (e.g., images, video, screenshot(s)) captured in the environment using a second modality sensor. The second modality may be different than the first modality sensor, e.g., vision versus audio, and may include, for instance, images captured by cameras and/or bitmap or vector screenshots. At block 308, the system, e.g., by way of image encoder 128 and/or video encoder 130, may encode the second modality data into one or more second modality embeddings (e.g., 129, 131) using a trained second modality encoder that is stored in memory of one or more of the edge-based client devices.

At block 310, the system, e.g., by way of multimodal encoder 132, may process one or more of the first modality embeddings and one or more of the second modality embeddings using an edge-based multimodal LLM 132A that is stored locally in memory of one or more of the edge-based client devices (e.g., 110, 210) to generate a multimodal contextual embedding 133. In some implementations, edge-based multimodal LLM 132A may additionally be applied to sensor data and/or embedding(s) of sensor data generated by sensor(s) 115.

At block 312, the system may provide, e.g., over one or more networks 199 to a remote server (e.g., 138) that hosts a central LLM (e.g., an LLM in database 141A), data indicative of both the multimodal embedding and an NL input provided by the user. For the NL input, in some implementations, the client device may provide the query embedding 125. At block 314, the system (e.g., 110, 210) may receive, e.g., from the remote server (e.g., 138), information generated using the central LLM (e.g., LLM in database 141A) that is responsive to the NL input provided by the user.

Figure 4:
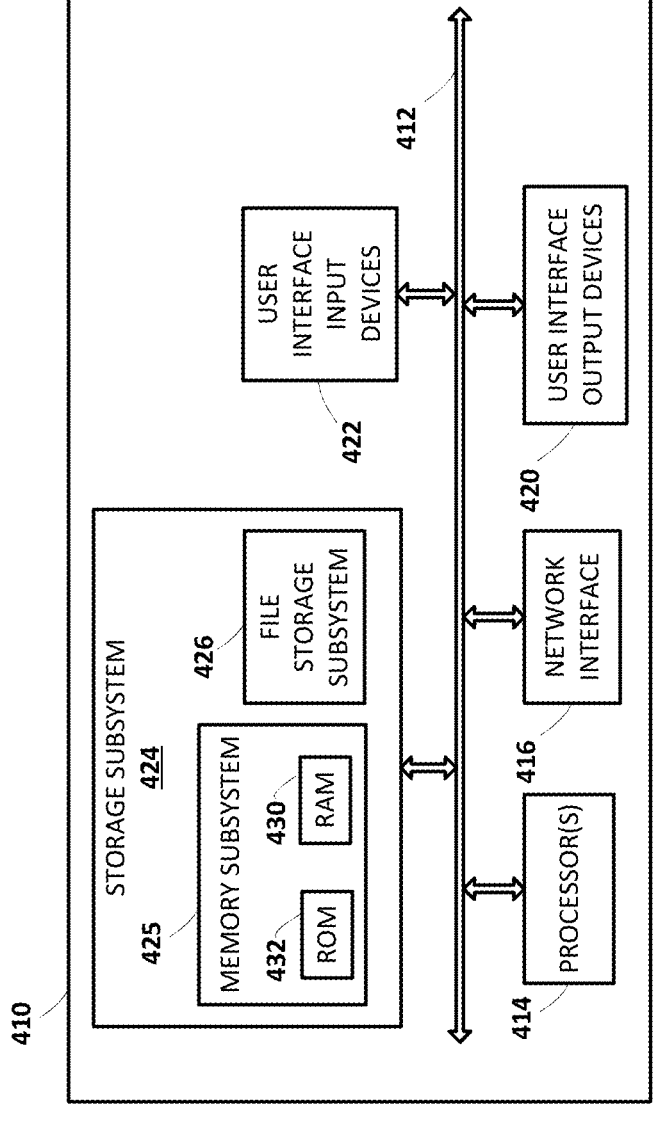
FIG. 4 depicts an example architecture of a computing device, in accordance with various implementations.

Turning now to FIG. 4, a block diagram of an example computing device 410 that may optionally be utilized to perform one or more aspects of techniques described herein is depicted. In some implementations, one or more of a client device, cloud-based automated assistant component(s) or other cloud-based software application component(s), and/or other component(s) may comprise one or more components of the example computing device 410.

Computing device 410 typically includes at least one processor 414 which communicates with a number of peripheral devices via bus subsystem 412. These peripheral devices may include a storage subsystem 424, including, for example, a memory subsystem 425 and a file storage subsystem 426, user interface output devices 420, user interface input devices 422, and a network interface subsystem 416. The input and output devices allow user interaction with computing device 410. Network interface subsystem 416 provides an interface to outside networks and is coupled to corresponding interface devices in other computing devices.

User interface input devices 422 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 410 to the user or to another machine or computing device.

Storage subsystem 424 stores programming and data constructs that provide the functionality of some or all of the modules described herein. For example, the storage subsystem 424 may include the logic to perform selected aspects of the method 300 disclosed herein, as well as to implement various components depicted in FIGS. 1 and 2.

These software modules are generally executed by processor 414 alone or in combination with other processors. Memory 425 used in the storage subsystem 424 can include a number of memories including a main random-access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computing device 410 communicate with each other as intended. Although bus subsystem 412 is shown schematically as a single bus, alternative implementations of the bus subsystem 412 may use multiple buses.

Computing device 410 can be of varying types including a workstation, server, computing cluster, blade server, server farm, or any other data processing system or computing device. Due to the ever-changing nature of computers and networks, the description of computing device 410 depicted in FIG. 4 is intended only as a specific example for purposes of illustrating some implementations. Many other configurations of computing device 410 are possible having more or fewer components than the computing device depicted in FIG. 4.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:
1. A method implemented using one or more processors of one or more edge-based client devices and comprising:
   contemporaneously with receipt of a natural language input from a user, obtaining a first digital image cap- tured in an environment using a front-facing camera of a given edge-based client device;

encoding the first digital image into one or more first modality embeddings using a trained first modality encoder that is stored in memory of the given edge-based client device;

contemporaneously with receipt of the natural language input, obtaining a second digital image captured in the environment, wherein the second digital image comprises a screenshot captured by the given edge-based client device or is captured using a rear-facing camera of the given edge-based client device;

encoding the second digital image into one or more second modality embeddings using a trained second modality encoder that is stored in memory of one or more of the edge-based client devices;

processing one or more of the first modality embeddings and one or more of the second modality embeddings using an edge-based multimodal large language model (LLM) that is stored locally in memory of the given edge-based client device to generate a multimodal contextual embedding;

providing, to a remote server that hosts a central LLM, data indicative of the multimodal contextual embedding and the natural language input provided by the user; and receiving, from the remote server, information generated using the central LLM that is responsive to the natural language input provided by the user.

2. The method of claim 1, wherein the second digital image comprises the screenshot captured by the given edge-based client device.

3. The method of claim 1, wherein the first digital image captures a facial expression of the user, and one or more of the first modality embeddings numerically represents the captured facial expression.

4. An edge-based system comprising one or more edge processors and memory storing instructions that, in response to execution by the one or more edge processors, cause the one or more edge processors to:

contemporaneously with receipt of a natural language input from a user, obtain a first digital image captured in an environment using a front-facing camera of a given edge-based client device;

encode the first digital image into one or more first modality embeddings using a trained first modality encoder that is stored in memory of the given edge-based client device;

contemporaneously with receipt of the natural language input, obtain a second digital image captured in the environment, wherein the second digital image comprises a screenshot captured by the given edge-based client device or is captured using a rear-facing camera of the given edge-based client device;

encode the second digital image into one or more second modality embeddings using a trained second modality encoder that is stored in memory of the given edge-based client device;

process one or more of the first modality embeddings and one or more of the second modality embeddings using an edge-based multimodal large language model (LLM) that is stored locally in memory of one or more of the edge-based client devices to generate a multimodal contextual embedding;

provide, to a remote server that hosts a central LLM, data indicative of the multimodal contextual embedding and the natural language input provided by the user; and receive, from the remote server, information generated using the central LLM that is responsive to the natural language input provided by the user.

5. The system of claim 4, wherein the first digital image captures a facial expression of the user, and one or more of the first modality embeddings numerically represents the captured facial expression.

6. At least one non-transitory computer-readable medium comprising instructions that, in response to execution by one or more edge processors, cause the one or more edge processors to:

contemporaneously with receipt of a natural language input from a user, obtain a first digital image captured in an environment using a front-facing camera of a given edge-based client device;

encode the first digital image into one or more first modality embeddings using a trained first modality encoder that is stored in memory of the given edge-based client device;

contemporaneously with receipt of the natural language input, obtain a second digital image captured in the environment, wherein the second digital image comprises a screenshot captured by the given edge-based client device or is captured using a rear-facing camera of the given edge-based client device;

encode the second digital image into one or more second modality embeddings using a trained second modality encoder that is stored in memory of the given edge-based client device;

process one or more of the first modality embeddings and one or more of the second modality embeddings using an edge-based multimodal large language model (LLM) that is stored locally in memory of one or more of the edge-based client devices to generate a multimodal contextual embedding;

provide, to a remote server that hosts a central LLM, data indicative of the multimodal contextual embedding and the natural language input provided by the user; and receive, from the remote server, information generated using the central LLM that is responsive to the natural language input provided by the user.

* * * * *